United States Patent
Heiskanen (10) Patent No.: US 9,735,908 B2
(45) Date of Patent: Aug. 15, 2017

(54) ADAPTIVE FREQUENCY BAND WEIGHTING WITHIN TIME DOMAIN

(71) Applicant: NOKIA SOLUTIONS AND NETWORKS OY, Espoo (FI)

(72) Inventor: Antti Heiskanen, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/829,315

(22) Filed: Aug. 18, 2015

(65) Prior Publication Data
US 2017/0054523 A1   Feb. 23, 2017

(51) Int. Cl.
*H04J 11/00* (2006.01)
*H04L 27/26* (2006.01)
*H04B 1/04* (2006.01)
*H04B 1/12* (2006.01)
*H04B 1/525* (2015.01)

(52) U.S. Cl.
CPC ........ *H04J 11/0023* (2013.01); *H04B 1/0475* (2013.01); *H04B 1/123* (2013.01); *H04B 1/525* (2013.01); *H04L 27/2646* (2013.01)

(58) Field of Classification Search
CPC . H04L 27/2646; H04J 11/0023; H04B 1/0475
See application file for complete search history.

(56) References Cited

U.S. PATENT DOCUMENTS

| | | | | |
|---|---|---|---|---|
| 6,047,022 A * | 4/2000 | Reuven | ................. | H04L 27/00 375/222 |
| 6,587,514 B1 * | 7/2003 | Wright | .................. | H03F 1/3241 330/149 |
| 6,658,045 B1 * | 12/2003 | Jin | ..................... | H04B 1/7115 375/141 |
| 7,676,046 B1 | 3/2010 | Nelson et al. | | |
| 2004/0122627 A1 | 6/2004 | Kybett et al. | | |
| 2005/0152487 A1 * | 7/2005 | Reichard | .......... | H04L 25/03133 375/350 |
| 2005/0212691 A1 | 9/2005 | Tirkel et al. | | |
| 2006/0240786 A1 | 10/2006 | Liu | | |

(Continued)

FOREIGN PATENT DOCUMENTS

WO   03005581 A1   1/2003

OTHER PUBLICATIONS

U.S. Office Action U.S. Appl. No. 14/829,296 issued Apr. 19, 2016.

(Continued)

*Primary Examiner* — Ross Varndell
(74) *Attorney, Agent, or Firm* — Squire Patton Boggs (US) LLP (57) ABSTRACT

Various signal processing systems may benefit from appropriate control based on selected parameters. For example, feedforward-based signal or noise cancellation systems may benefit from adaptive frequency band weighting within time domain. A method can include receiving an input signal that is to be transmitted over a channel. The method can also include calculating an instantaneous frequency of the input signal. The method can further include applying the instantaneous frequency as an adaptive parameter in an adaptation performed relative to the input signal. The method can additionally include providing an output signal based on the adaptation.

18 Claims, 11 Drawing Sheets

(56) References Cited

U.S. PATENT DOCUMENTS

2007/0036238 A1* 2/2007 Matero ............... H03C 3/0925
　　　　　　　　　　　　　　　　　　　　　　　375/296
2008/0076374 A1　　3/2008 Grenader
2008/0310573 A1　12/2008 Lewis et al.

OTHER PUBLICATIONS

Texas Instruments; "Design of Active Noise Control Systems with the TMS320 Family"; Application Report; Digital Signal Processing Solutions; Jun. 1996; 171 pages.
Engin Kurt, et al.; "An Adaptive Feedforward Amplifier Application for 5.8 GHz"; Turk J Elec Engin, vol. 14, No. 3, 2006; pp. 437-443.
Alison M. Smith; "A Wideband Adaptive Feedforward Amplifier Lineariser"; A Thesis submitted in Partial Fulfillment of the Requirements for the Degree of Master off Applied Science.
European Search Report issued in corresponding European Application No. 16175618.4 on Nov. 17, 2016.
U.S. Office Action dated Oct. 31, 2016 corresponding to U.S. Appl. No. 14/829,310.

* cited by examiner

ADAPTIVE FREQUENCY BAND WEIGHTING WITHIN TIME DOMAIN

BACKGROUND

Field

Various signal processing systems may benefit from appropriate control based on selected parameters. For example, feedforward-based signal or noise cancellation systems may benefit from adaptive frequency band weighting within time domain.

Description of the Related Art

Digitally controlled adaptive feedforward-based signal or noise cancellation systems are widely used within many application areas to optimize system performance. Many times the feedforward noise or signal cancellation algorithm can use time-domain signal waveforms to control the adaptation process. Within telecommunication systems, for example, the time domain signals tend to be broadband and the signal or noise cancellation can be much more difficult as compared to such cancellation in narrow band systems.

Fifth generation (5G) and subsequent technology may increasingly rely on broadband systems. Also, carrier aggregation within current radio systems broadens the signal bandwidth. The widening of signal bandwidth may render existing adaptive algorithms and feedforward systems ineffective.

Figure 1:
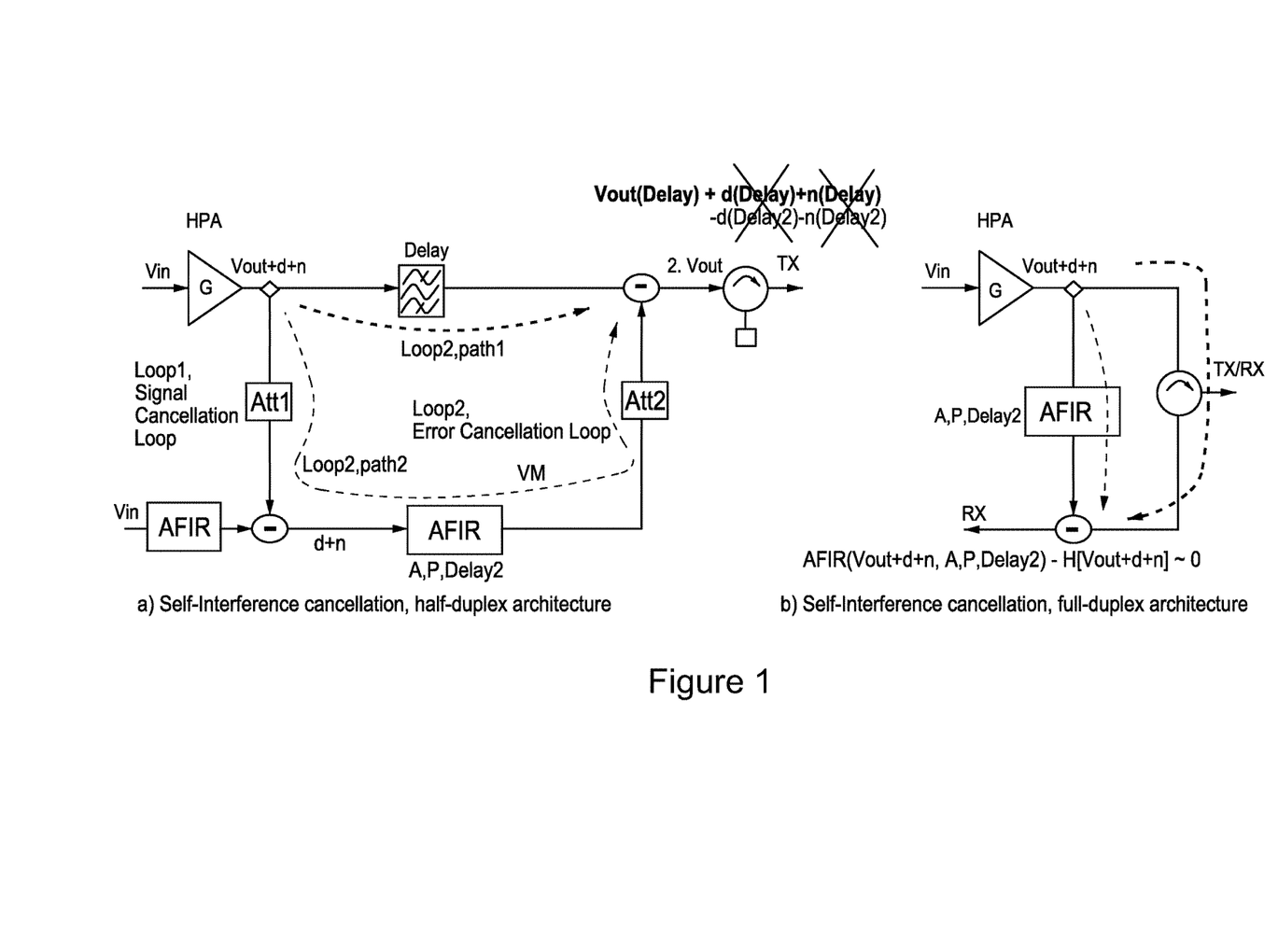
FIG. 1 illustrates example application areas for feedforward based signal cancellation use.

FIG. 1 illustrates example application areas for feedforward based signal cancellation use. FIG. 1, in particular, illustrates a self-interference cancellation half-duplex architecture at (a) and a self-interference cancellation, full-duplex architecture at (b). Amplitude and phase shifters or I&Q vector modulators may be sufficient if the required signal cancellation bandwidth is narrow. However, when the cancellation bandwidth is broad, the non-idealities may shape the unwanted signal delay and frequency response over broadband in such manner that it is difficult to cancel it with an analog domain signal canceller. Therefore, more advanced analog signal cancellation circuits may be needed.

Also, the adaptive time-domain algorithms performance starts to be limited for broadband signals. Such limitations may particularly acute if a complex AFIR or AIIR analog canceller needs to be adaptively controlled.

Time-domain adaptive algorithms tend to optimize the performance into frequencies that have the highest probability to occur. As an example, a simple LMS algorithm signal cancellation simulation is used to show that tendency.

Figure 2:
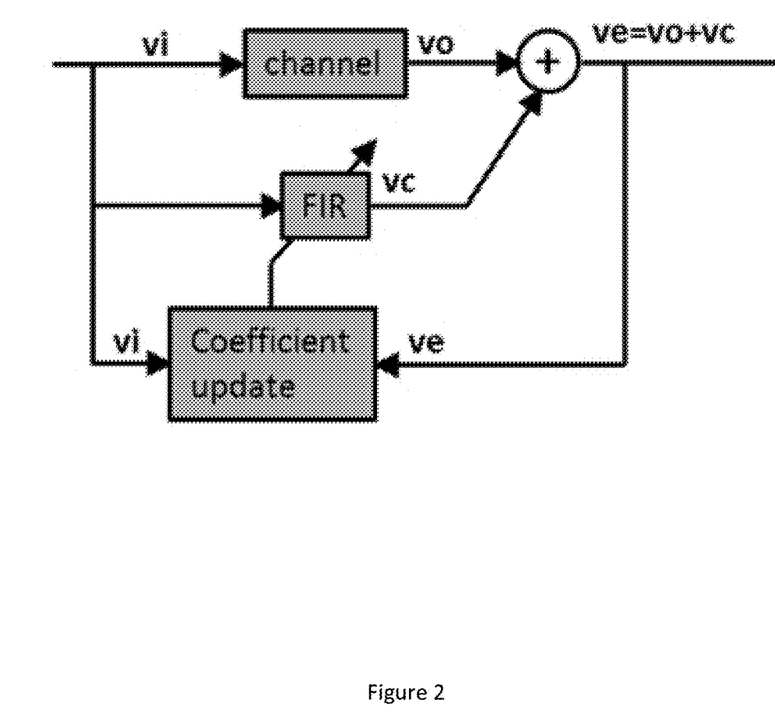
FIG. 2 illustrates an example feedforward signal cancellation architecture.

FIG. 2 illustrates an example feedforward signal cancellation architecture. As shown in FIG. 2, there can be an input signal vi which goes through an unknown system channel. The signal vi can be copied and taken as input to adaptive control of complex gain element FIR. The other control signal of the adaptive control can be the feedback signal formed by the subtraction output of channel and FIR. Hence, if the signal canceller FIR can produce equal amplitude and delay but opposite phase output signal to the channel output signal, there will be zero at the main output, thus ve would be zero, where ve is an error signal. In this example vi can be an extremely broadband OFDM signal. The channel can have a slight frequency response deviation.

Figure 3:
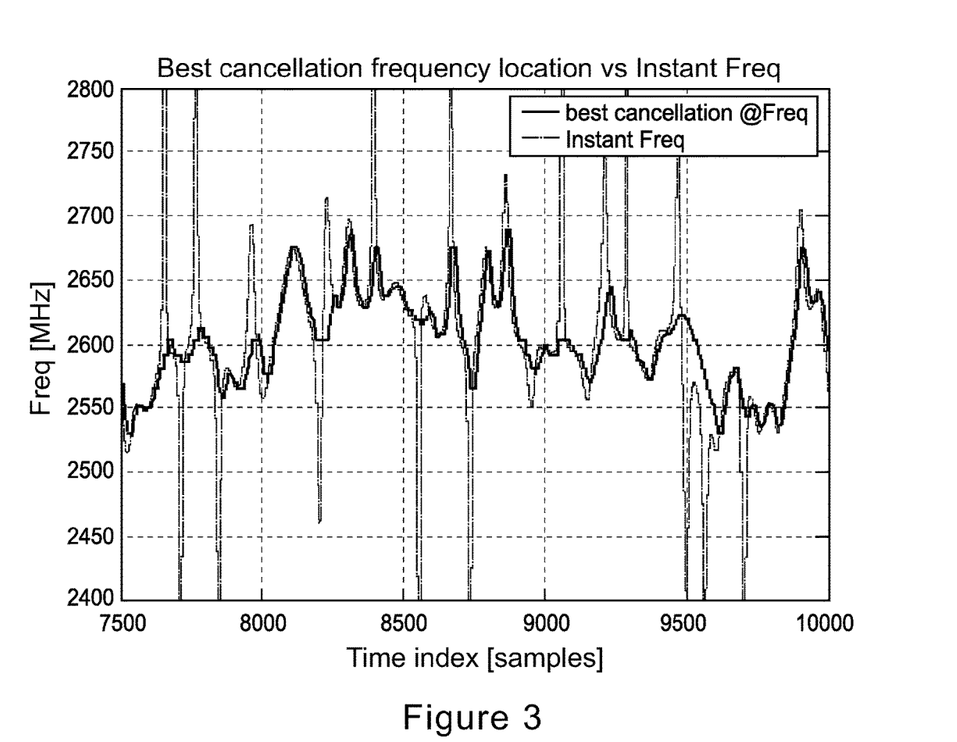
FIG. 3 illustrates frequency location of best cancellation over broadband over time versus signal instantaneous frequency.

FIG. 3 illustrates frequency location of best cancellation over broadband over time versus signal instantaneous frequency. Thus, FIG. 3 shows the calculated instantaneous frequency of vi and the frequency location of best cancellation over time. As can be seen from FIG. 3, the best cancellation follows the instantaneous frequency. This is because the input signal vi and error signal ve are used as adaptation control signals. Therefore, the cancellation performance follows the signal instantaneous frequency because that is controlling the way in which the cancellation is performed.

Figure 4:
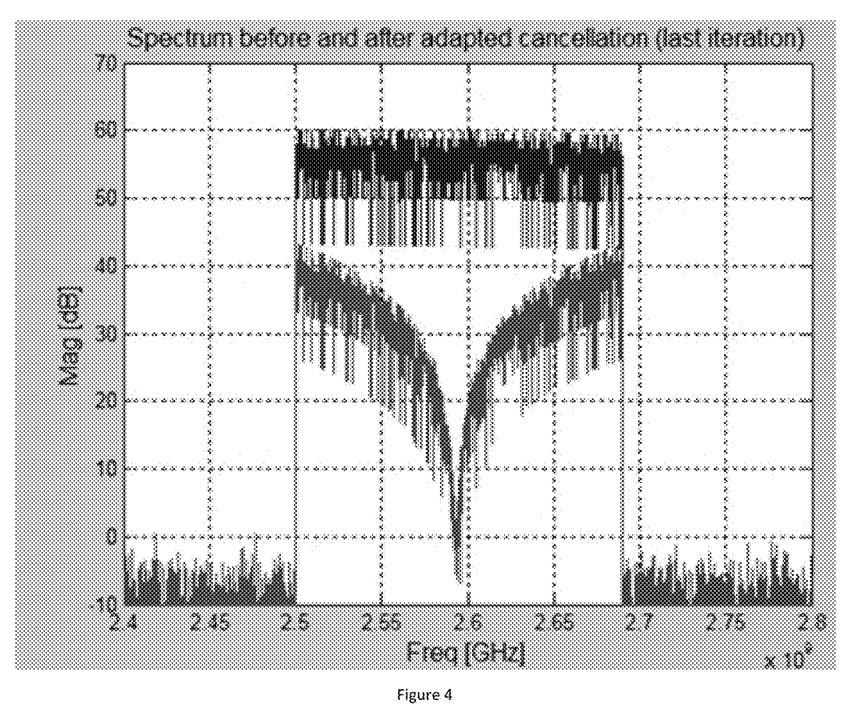
FIG. 4 illustrates spectrum of signal cancellation broad band performance at one time instant.

The corresponding spectrum over long time is shown in FIG. 4. More particularly, FIG. 4 illustrates spectrum of signal cancellation broad band performance at one time instant, with the adaptation frozen.

The simulation is an extreme example, but illustrates that the time-domain algorithm followed the control signal instantaneous frequency. In practice, in the case of RF signal cancellation, the algorithm cannot follow the RF waveform. Thus, the adaptation is done using historical information, but still time-domain data, possibly down converted ve and/or vi signal. This means that there are significant time durations when the control of analog canceller is not optimal. Thus, the signal frequency may be different compared to the location where optimal cancellation is. Furthermore, in some systems there is pre-defined band where the optimal cancellation is wanted. If the vi or ve signal contains signal frequencies on other frequencies as well, those frequency contents may shift the optimal cancellation performance into unwanted band.

Traditionally the control of band where the optimal cancellation is wanted is controlled with very sharp filters. Thus, unwanted frequencies are filtered out before the adaptation process. This way the adaptation may be optimized into the wanted band.

SUMMARY

According to certain embodiments, a method can include receiving an input signal that is to be transmitted over a channel. The method can also include calculating an instantaneous frequency of the input signal. The method can further include applying the instantaneous frequency as an adaptive parameter in an adaptation performed relative to the input signal. The method can additionally include providing an output signal based on the adaptation.

In certain embodiments, an apparatus can include at least one processor and at least one memory including computer program code. The at least one memory and the computer program code can be configured to, with the at least one processor, cause the apparatus at least to receive an input signal that is to be transmitted over a channel. The at least one memory and the computer program code can also be configured to, with the at least one processor, cause the apparatus at least to calculate an instantaneous frequency of the input signal. The at least one memory and the computer program code can further be configured to, with the at least one processor, cause the apparatus at least to apply the instantaneous frequency as an adaptive parameter in an adaptation performed relative to the input signal. The at least one memory and the computer program code can additionally be configured to, with the at least one processor, cause the apparatus at least to provide an output signal based on the adaptation.

An apparatus, according to certain embodiments, can include means for receiving an input signal that is to be transmitted over a channel. The apparatus can also include means for calculating an instantaneous frequency of the input signal. The apparatus can further include means for applying the instantaneous frequency as an adaptive parameter in an adaptation performed relative to the input signal. The apparatus can additionally include means for providing an output signal based on the adaptation.

A computer program product, according to certain embodiments, may be encoded with instructions for performing a process. The process can include receiving an input signal that is to be transmitted over a channel. The process can also include calculating an instantaneous frequency of the input signal. The process can further include applying the instantaneous frequency as an adaptive parameter in an adaptation performed relative to the input signal. The process can additionally include providing an output signal based on the adaptation.

In certain embodiments, a non-transitory computer-readable medium can be encoded with instructions that, when executed in hardware, perform a process. The process can include receiving an input signal that is to be transmitted over a channel. The process can also include calculating an instantaneous frequency of the input signal. The process can further include applying the instantaneous frequency as an adaptive parameter in an adaptation performed relative to the input signal. The process can additionally include providing an output signal based on the adaptation.

BRIEF DESCRIPTION OF THE DRAWINGS

For proper understanding of the invention, reference should be made to the accompanying drawings, wherein.

DETAILED DESCRIPTION

Within time-domain approaches to signal cancellation, there is conventionally no information on the frequency of the signal. Certain embodiments provide for time-domain adaptive feedforward control. A method is described which may allow use of a time-domain approach in which frequency information is used as an additive control parameter. More broadband cancellation control may be possible as a result.

More particularly, certain embodiments use instantaneous frequency within time-domain algorithm. Therefore the instant frequency of an input signal vi can also be calculated so that the system can use that quantity to affect the signal cancellation characteristics. More particularly, as mentioned above, certain embodiments can use the signal instantaneous frequency of vi as an additive parameter within a time-domain adaptive method, to provide additive cancellation band control. Thus, a system according to certain embodiments can control the cancellation band and possibly band select filters may be omitted.

Certain embodiments may be applicable to many time domain sample-by-sample algorithms. More particularly, certain embodiments use an input signal's instantaneous frequency as an additive adaptation control parameter within time-domain adaptation.

The least mean square (LMS) algorithm based feedforward signal cancellation example is used as an application example. FIG. 2 show the example feed-forward signal cancellation test connection that is widely used within DSP textbooks.

Two example application cases for certain embodiments are shown and discussed below, while it should be understood that other embodiments may likewise be constructed. As mentioned above, an input signal vi can go through an unknown channel which can shape the vi signal into vo. FIR may be used to adaptively create a signal vc that cancels the vo signal. The adaptive work function is shown in equation (1).

$$W(n+1)=W(n)+\mu \cdot vi(n) \cdot ve(n)^* \quad (1)$$

Here, W represents the coefficients of the FIR. The labelling of the signals is the same as in FIG. 2. The coefficient myy, which may be a constant, can be used to control the adaptation. The signals can be real or complex. The error signal can be the sum signal as seen from FIG. 2. The coefficient update function can be any desired time domain algorithm.

However, the coefficient update work function (1) does not have any information on the signal frequency while it calculates the FIR coefficients. This makes the FIR to follow the instant frequency of the control signals and part of the time the performance may be at wrong frequency, especially when the target signal bandwidth is broad. The signal cancellation may be poor outside the current optimal cancellation frequency.

Figure 5:
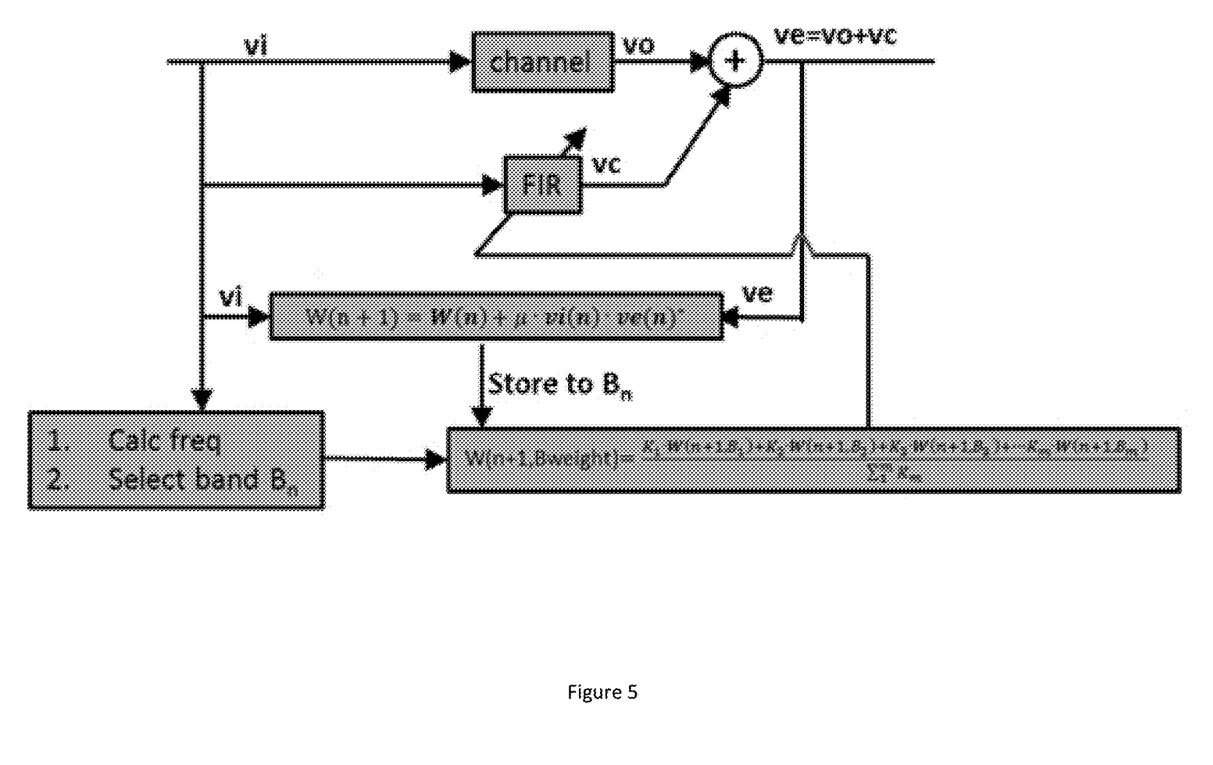
FIG. 5 illustrates frequency band weighted timed domain feedforward signal cancellation, according to certain embodiments.

FIG. 5 illustrates frequency band weighted timed domain feedforward signal cancellation, according to certain embodiments. As shown in FIG. 5, the adaptive method can be modified so that the next FIR coefficients W(n+1) are calculated as above but the FIR coefficients are not used within the FIR.

Instead, the FIR coefficients can be updated into a frequency band weighting function that is seen in FIG. 5. Here, the complex input signal instant frequency can be calculated, for example time derivative from time varying phase. The calculated FIR coefficients W(n+1) can be stored into the frequency band weighting function which gives the new FIR coefficients W(n+1,Bweight), where the Bweight is the frequency band weighting vector.

This way the past FIR coefficients can be weighted as well for as many bands into which the user wants to divide the signal spectrum. Some frequency bands can be easily rejected from the adaptation completely, if wanted.

In certain embodiments, only one W(n+1,Bn) is updated at a time, depending on the frequency. Thus, the rest of the weighted coefficients can refer to the past while there is n+1 index.

For example, there may be three bands of interest, which can be designated b1, b2, and b3 (the weighting vector for the bands is [K1 K2 K3] correspondingly). Moreover, the FIR can have 6 coefficients, for example. For each band there can be a weighting coefficient Kn. In this example, the below coefficient vectors may be updated whenever the instantaneous frequency value is within the limits of b1, b2 or b3.

b1 K1*[h0 h1 h2 h3 h4 h5]
b2 K2*[h0 h1 h2 h3 h4 h5]
b3 K3*[h0 h1 h2 h3 h4 h5]

Used coefficients, h0=1/sum(Kn)*[K1*h0(b1)+K2*h0(b2)+K3*h0(b3)]

Used coefficients, h1=1/sum(Kn)*[K1*h1(b1)+K2*h1(b2)+K3*h1(b3)]

The rest of the used coefficients can be calculated similarly as above.

As can be seen from above 6 coefficient 3 band FIR example, while being at frequencies within b1 the corresponding 6-FIR coefficients can be adapted and all coefficients weighted with K1 but not used to produce the FIR output. Also, while being at frequencies within b2 the corresponding 6-FIR coefficients can be adapted and all coefficients weighted with K2 but not used to produce the FIR output. Also, while being at frequencies within b3 the corresponding 6-FIR coefficients can be adapted and all coefficients weighted with K3 but not used to produce the FIR output.

The final FIR output can be formed from FIR where each weighted FIR coefficient hn are summed and divided with the total sum of used weights (K1, K2, K3 in this case). As an example, the final FIR coefficients h0 and h1 are shown above (used coefficients h0 and h1). As the signal can have only one frequency at a time, while adapting at one band the other weighted coefficients represent memory from other bands and thus good broadband performance may be maintained even though time-domain adaptive algorithms tend to optimize performance for current signal frequency.

Adaptation can be controlled by weighting the coefficients based on what signal frequencies there have been within the adaptation of individual Wn. Adaptation can be omitted when the signals have unwanted frequency content.

Figure 6:
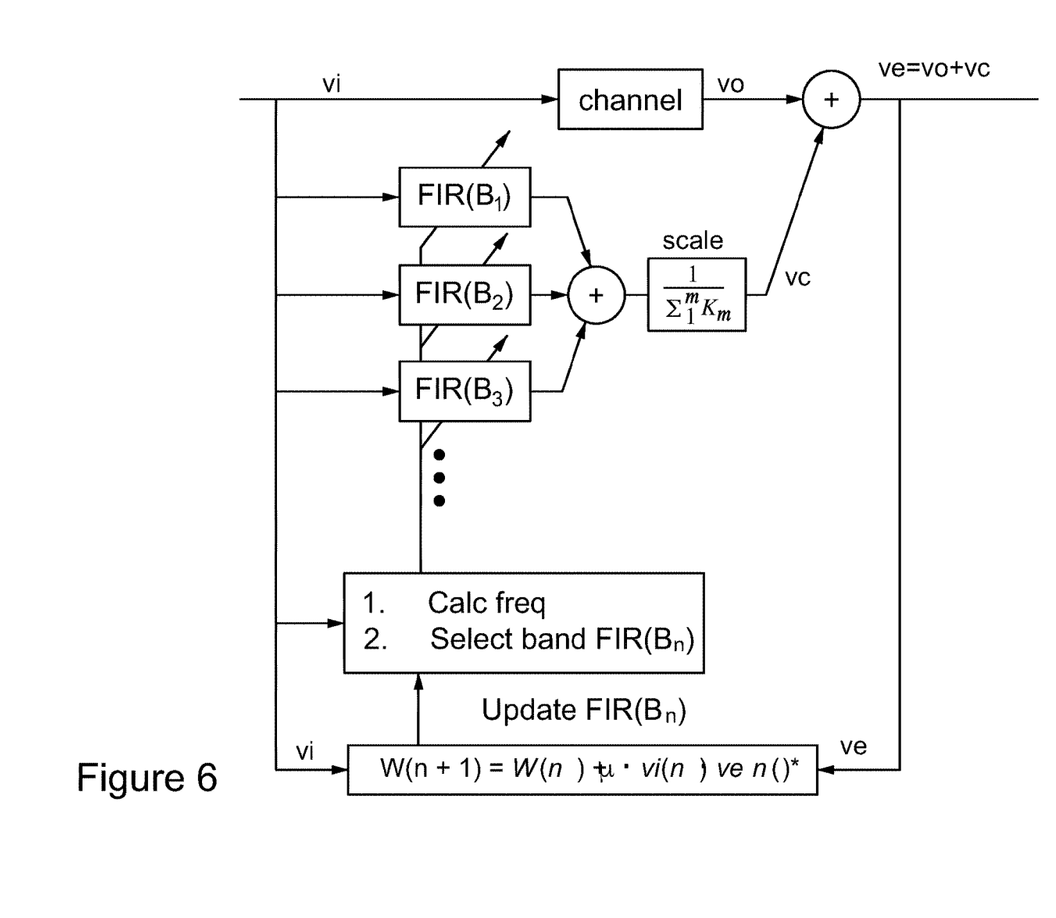
FIG. 6 illustrates frequency band weighted timed domain feedforward signal cancellation, according to certain embodiments.

FIG. 6 illustrates frequency band weighted timed domain feedforward signal cancellation, according to certain embodiments. As shown in FIG. 6, there can be an alternative architecture. Within this configuration the frequency weighting can happen by updating parallel FIR filters with current new coefficients. The FIR to be updated can be selected based on the instant frequency calculation. The scale-gain can be used to make the sum signal have the correct gain.

Yet another method is formed when each shown FIR(Bn) is taken to represent one analog FIR coefficient. Hence, each analog FIR coefficient could be updated whenever the instant frequency is within frequency limits set for that coefficient.

Figure 7:
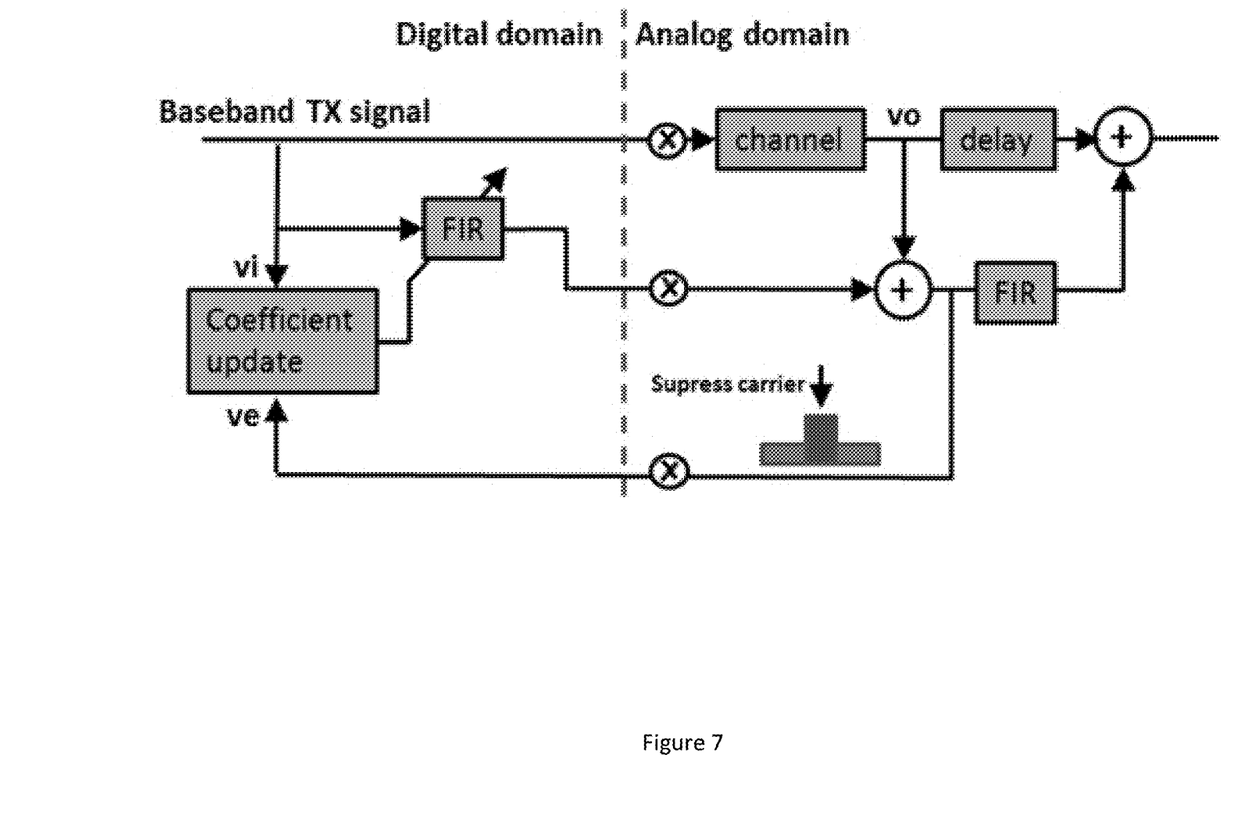
FIG. 7 illustrates a feedforward RF amplifier with DSP FIR based Loop1 control, according to certain embodiments.

FIG. 7 illustrates a feedforward RF amplifier with DSP FIR based Loop1 control, according to certain embodiments. A feedforward amplifier as shown in FIG. 7 can be another application area where certain embodiments can be used.

In FIG. 7, the block diagram is simplified so that only the main blocks are shown in respect to the adaptive algorithm. Thus, the baseband signal vi can be up-converted into RF. Signal vi can go through some unknown channel and create output signal vu. A digital FIR can be used to shape the same input signal vi which is up-converted into RF. The feedback signal to the FIR algorithm can be the sum signal labelled as ve, after down conversion.

If the baseband signals of this configuration are the same as in FIG. 2 above, gradually the FIR can produce a signal that forces the error signal ve to be zero. Certain embodiments may provide superior adaptation to that shown in FIG. 2, because certain embodiments can adapt only during signal time periods that have frequencies of vi. For example, the vo signal can include distortion components that have more broadband frequency content. Frequency weighting can be used to zero those unwanted frequencies, thereby preventing them from affecting the FIR update values. Also, inside the frequencies of vi there can be further frequency band weighting.

Without such consideration of instantaneous frequency, the method may update the FIR even at time periods when the vo signal has frequency outside the signal band of vi, such as adjacent channel IMD signals, for example. The alternative configuration shown in FIG. 3 could also be used within this example.

Figure 8:
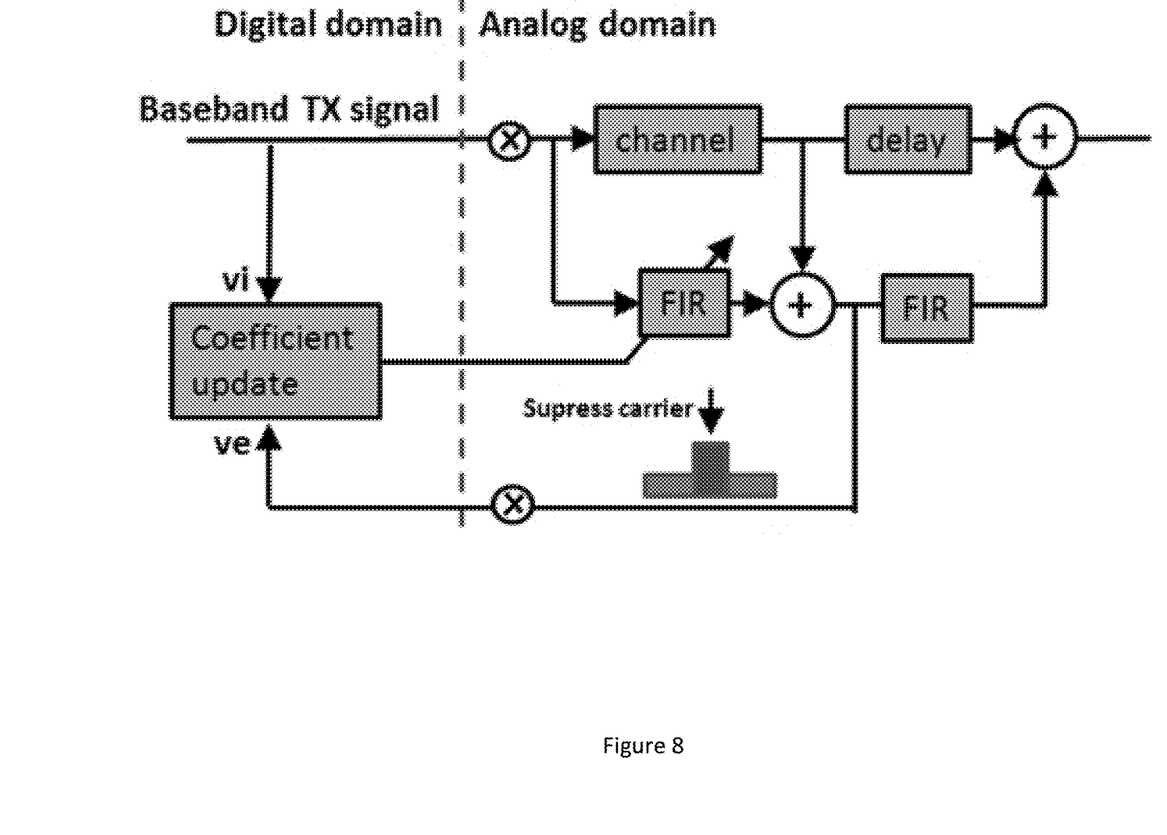
FIG. 8 illustrates a feedforward RF amplifier with analog FIR based Loop1 control, according to certain embodiments.

FIG. 8 illustrates a feedforward RF amplifier with analog FIR based Loop1 control, according to certain embodiments. This configuration may be similar to that in FIG. 7, but in FIG. 8 an analog FIR solution can be provided.

Loop1 can be the feedforward amplifier signal cancellation loop and Loop2 can be the feedforward amplifier error cancellation loop. Within the above examples, only the Loop1 logic block diagram is shown. Loop2 can operate similarly, but the target signal to be cancelled can be the distortion signal, not the target carrier.

Figure 9:
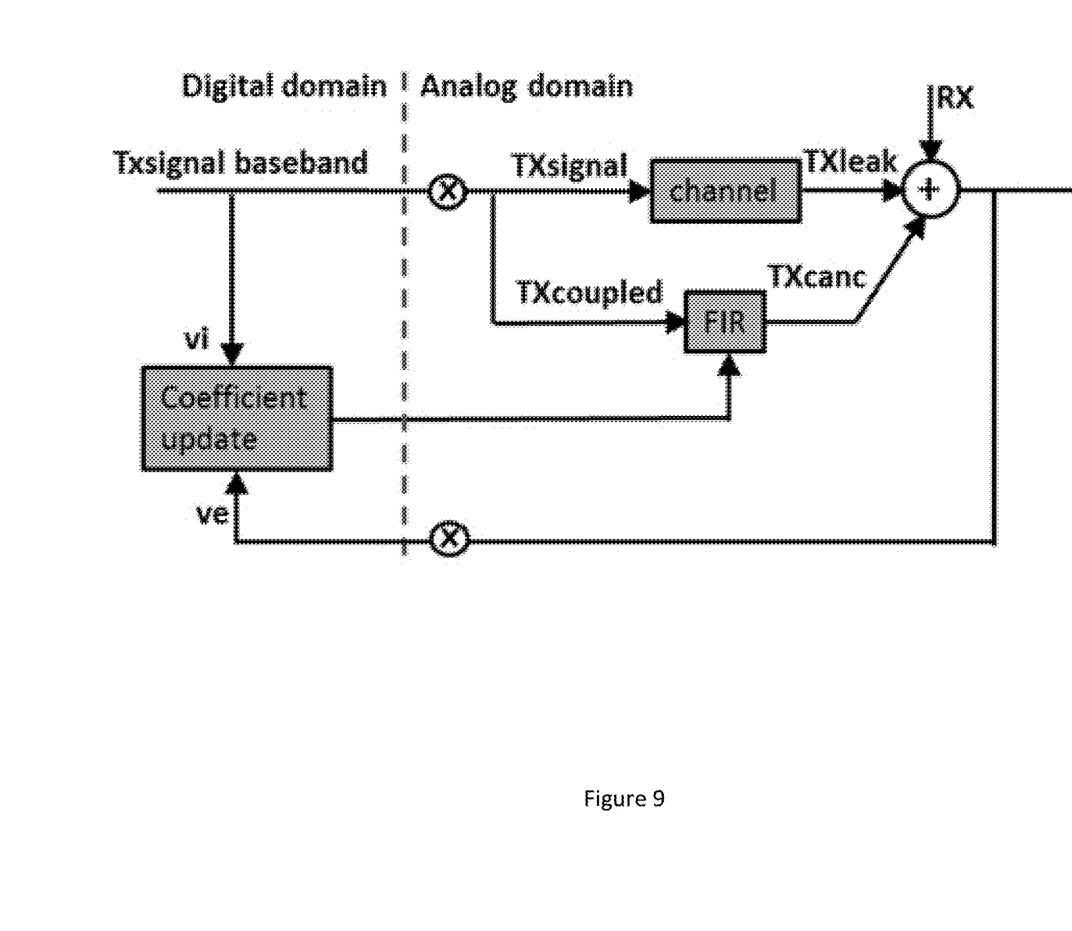
FIG. 9 illustrates full-duplex feedforward RF signal cancellation configuration, according to certain embodiments.

FIG. 9 illustrates full-duplex feedforward RF signal cancellation configuration, according to certain embodiments. As shown in FIG. 9, certain embodiments can be used within full-duplex radio. The block diagram illustrates the logical connection. The channel is, in this example, now the path for the TX signal to leak into receiver path. The RX signal can consider such leakage to be noise, and the method can try to minimize the TX signal.

The implementation examples above are relatively simple, although more complex implementations are also permitted. Certain embodiments, can be integrated into many time-domain algorithms. Only a least mean squared (LMS) approach was used as an example. Furthermore, only control signal instant frequency was used as a control parameter.

One could use the instant frequency of both the error signal and the input signal as additive control parameters. Furthermore, certain embodiments are an extension into time domain approaches. Certain embodiments may be an alternative to band filtering, because filters may be unable to cancel unwanted frequencies completely.

Figure 10:
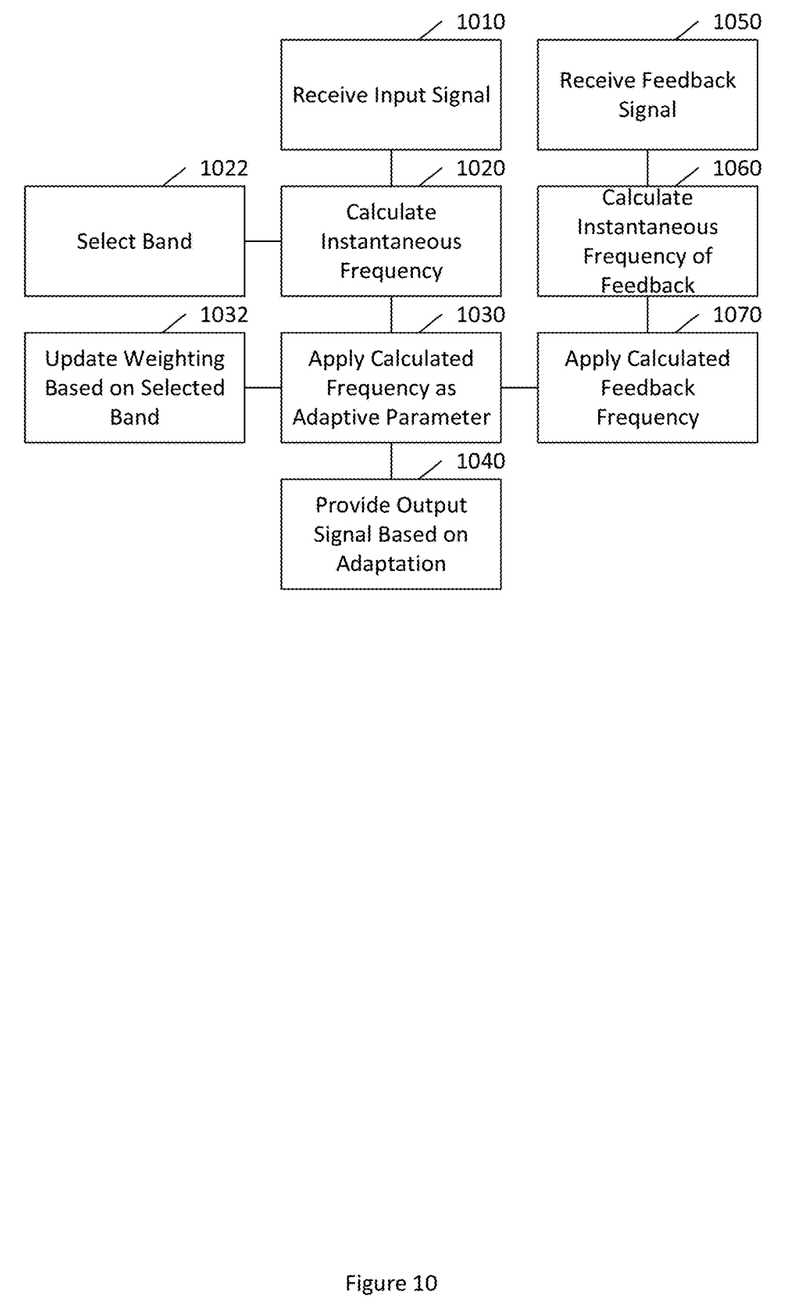
FIG. 10 illustrates a method according to certain embodiments.

FIG. 10 illustrates a method according to certain embodiments. As shown in FIG. 10, a method can include, at 1010, receiving an input signal that is to be transmitted over a channel. The method can also include, at 1020, calculating an instantaneous frequency of the input signal. The method can further include, at 1030, applying the instantaneous frequency as an adaptive parameter in an adaptation performed relative to the input signal. The method can additionally include, at 1040, providing an output signal based on the adaptation. The instantaneous frequency can be used within a time-domain method.

The method can additionally include, at 1050, receiving a feedback signal related to the input signal as affected by the channel. The method can further include, at 1060, calculating an instantaneous frequency of the feedback signal. The method can additionally include, at 1070, applying the instantaneous frequency of the feedback signal as an adaptive parameter together with the instantaneous frequency of the input signal in the adaptation.

The providing the output signal at 1040 can include providing a noise cancellation signal to a result of the transmission of the input signal over the channel. Examples of this can be seen, for example, in FIGS. 5-9. Moreover, the input signal can be a broadband signal, such as illustrated for example in FIG. 4.

The method can include, at 1022, selecting a band from a set of pre-configured bands, based on the calculated instantaneous frequency. The method can also include, at 1032, updating a weighting corresponding to the selected band.

The band can be a subset of a bandwidth of the input signal. On the other hand, the applying can involve applying the adaptation to the entire input signal. Thus, certain embodiments do not require simply applying different adaptations to different bands of the input signal. Instead, certain embodiments can apply a selected adaptation based on an identified dominant frequency at a particular time.

Figure 11:
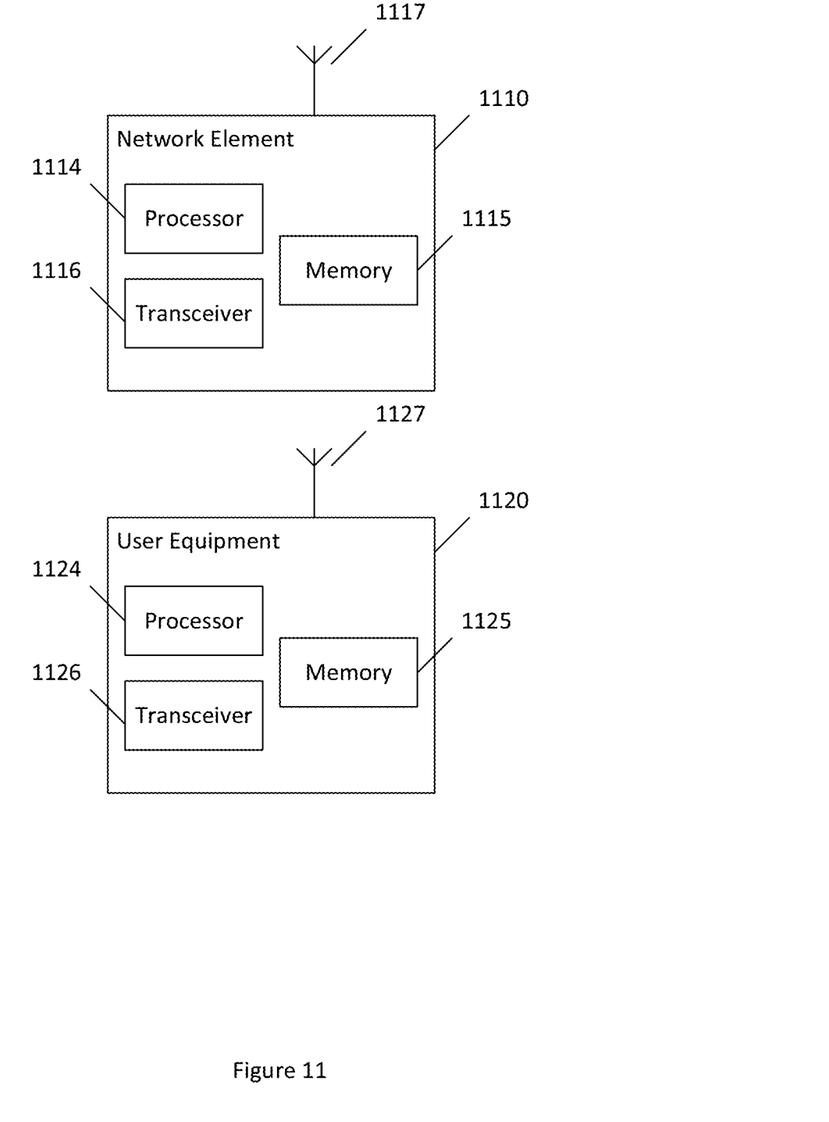
FIG. 11 illustrates a system according to certain embodiments.

FIG. 11 illustrates a system according to certain embodiments of the invention. It should be understood that each block of the diagrams of FIGS. 5-10 may be implemented by various means or their combinations, such as hardware, software, firmware, one or more processors and/or circuitry. As noted above, analog circuitry may be one way by which some of the described features are implemented, whereas other aspects may be implemented by digital elements as illustrated, for example, in FIGS. 7-9.

In one embodiment as illustrated in FIG. 11, a system may include several devices, such as, for example, network element 1110 and user equipment (UE) or user device 1120. The system may include more than one UE 1120 and more than one network element 1110, although only one of each is shown for the purposes of illustration. A network element can be an access point, a base station, an eNode B (eNB), or any other network element. Each of these devices may include at least one processor or control unit or module, respectively indicated as 1114 and 1124. At least one memory may be provided in each device, and indicated as 1115 and 1125, respectively. The memory may include computer program instructions or computer code contained therein, for example for carrying out the embodiments described above. One or more transceiver 1116 and 1126 may be provided, and each device may also include an antenna, respectively illustrated as 1117 and 1127. Although only one antenna each is shown, many antennas and multiple antenna elements may be provided to each of the devices. Other configurations of these devices, for example, may be provided. For example, network element 1110 and UE 1120 may be additionally configured for wired communication, in addition to wireless communication, and in such a case antennas 1117 and 1127 may illustrate any form of communication hardware, without being limited to merely an antenna.

Transceivers 1116 and 1126 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 1120 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 1120 may be a sensor or smart meter, or other device that may usually be configured for a single location.

In an exemplifying embodiment, an apparatus, such as a node or user device, may include means for carrying out embodiments described above in relation to FIGS. 5-10.

Processors 1114 and 1124 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 1115 and 1125 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 1110 and/or UE 1120, to perform any of the processes described above (see, for example, FIGS. 5-10). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 11 illustrates a system including a network element 1110 and a UE 1120, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

LIST OF ABBREVIATIONS

LMS least mean square
IMD Inter Modulation Distortion (cross distortion product created by two or more different frequency signals)
DSP Digital Signal Processing

I claim:

1. A method, comprising:
   receiving an input signal that is to be transmitted over a channel;
   calculating an instantaneous frequency of the input signal;
   applying the instantaneous frequency as an adaptive parameter in an adaptation performed relative to the input signal;
   providing an output signal based on the adaptation;
   selecting a band from a set of pre-configured bands, based on the calculated instantaneous frequency; and
   updating a weighting corresponding to the selected band.

2. The method of claim 1, wherein the instantaneous frequency is used within a time-domain method.

3. The method of claim 1, further comprising:
   receiving a feedback signal related to the input signal as affected by the channel;
   calculating an instantaneous frequency of the feedback signal; and
   applying the instantaneous frequency of the feedback signal as an adaptive parameter together with the instantaneous frequency of the input signal in the adaptation.

4. The method of claim 1, wherein the providing the output signal comprises providing a noise cancellation signal to a result of the transmission of the input signal over the channel.

5. The method of claim 1, wherein the input signal comprises a broadband signal.

6. The method of claim 1, wherein the band comprises a subset of a bandwidth of the input signal, and wherein the applying comprises applying the adaptation to the entire input signal.

7. An apparatus, comprising:
   at least one processor; and
   at least one memory including computer program code, wherein the at least one memory and the computer program code are configured to, with the at least one processor, cause the apparatus at least to
   receive an input signal that is to be transmitted over a channel;
   calculate an instantaneous frequency of the input signal;
   apply the instantaneous frequency as an adaptive parameter in an adaptation performed relative to the input signal;
   provide an output signal based on the adaptation;
   select a band from a set of pre-configured bands, based on the calculated instantaneous frequency; and
   update a weighting corresponding to the selected band.

8. The apparatus of claim 7, wherein the instantaneous frequency is used within a time-domain method.

9. The apparatus of claim 7, wherein the at least one memory and the computer program code are configured to, with the at least one processor, cause the apparatus at least to:
   receive a feedback signal related to the input signal as affected by the channel;
   calculate an instantaneous frequency of the feedback signal; and
   apply the instantaneous frequency of the feedback signal as an adaptive parameter together with the instantaneous frequency of the input signal in the adaptation.

10. The apparatus of claim 7, wherein the at least one memory and the computer program code are configured to, with the at least one processor, cause the apparatus at least to provide the output signal as a noise cancellation signal to a result of the transmission of the input signal over the channel.

11. The apparatus of claim 7, wherein the input signal comprises a broadband signal.

12. The apparatus of claim 7, wherein the band comprises a subset of a bandwidth of the input signal, and wherein the at least one memory and the computer program code are configured to, with the at least one processor, cause the apparatus at least to apply the adaptation to the entire input signal.

13. An apparatus, comprising:
    means for receiving an input signal that is to be transmitted over a channel;
    means for calculating an instantaneous frequency of the input signal;
    means for applying the instantaneous frequency as an adaptive parameter in an adaptation performed relative to the input signal;
    means for providing an output signal based on the adaptation;
    means for selecting a band from a set of pre-configured bands, based on the calculated instantaneous frequency; and
    means for updating a weighting corresponding to the selected band.

14. The apparatus of claim 13, wherein the instantaneous frequency is used within a time-domain method.

15. The apparatus of claim 13, further comprising:
    means for receiving a feedback signal related to the input signal as affected by the channel;
    means for calculating an instantaneous frequency of the feedback signal; and
    means for applying the instantaneous frequency of the feedback signal as an adaptive parameter together with the instantaneous frequency of the input signal in the adaptation.

16. The apparatus of claim 13, wherein the providing the output signal comprises providing a noise cancellation signal to a result of the transmission of the input signal over the channel.

17. The apparatus of claim 13, wherein the input signal comprises a broadband signal.

18. The apparatus of claim 13, wherein the band comprises a subset of a bandwidth of the input signal, and wherein the applying comprises applying the adaptation to the entire input signal.

* * * * *